Dec. 10, 1940.  H. C. CANINE  2,224,509
DISPENSING APPARATUS
Filed Jan. 6, 1940
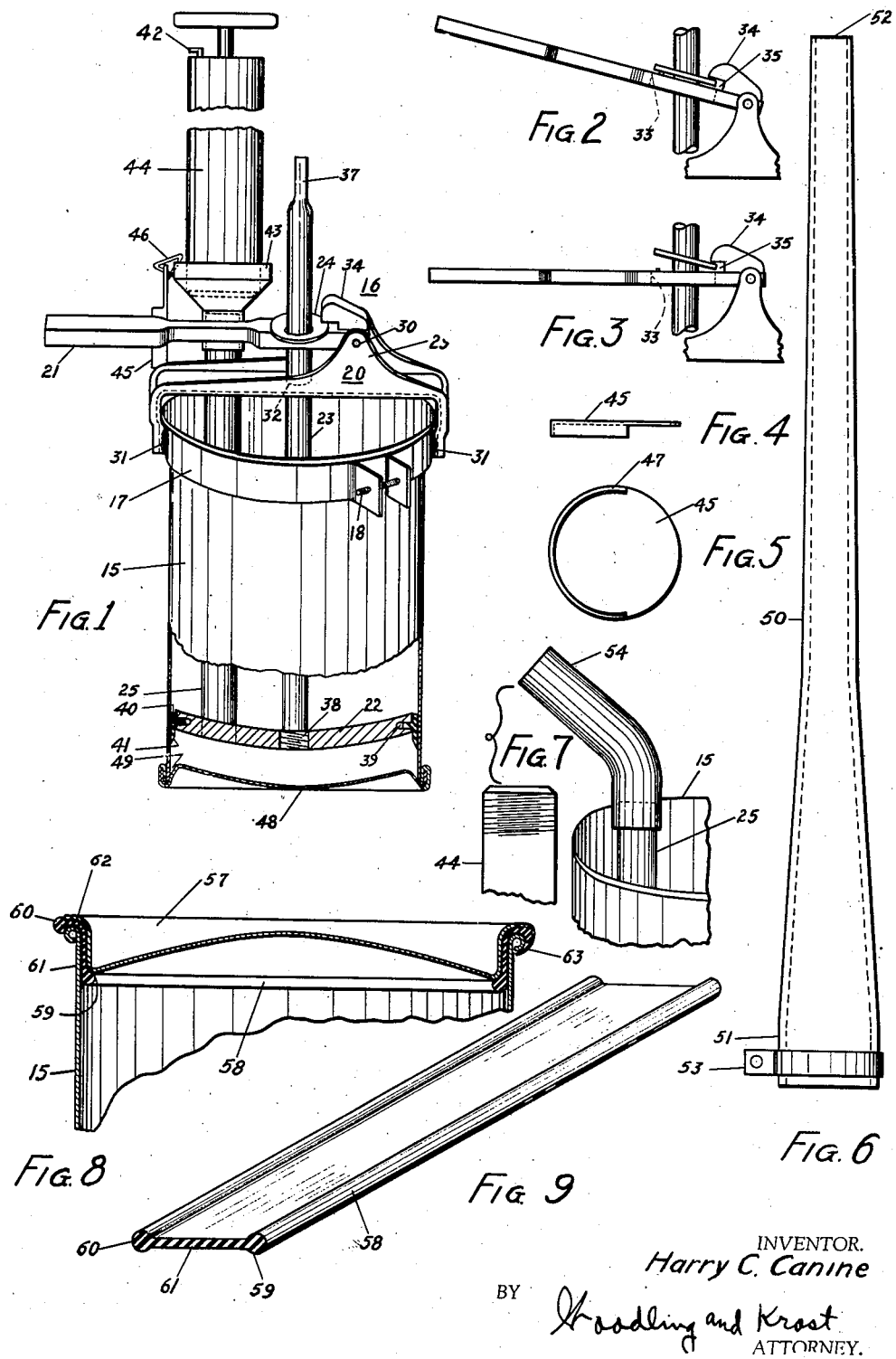
INVENTOR.
Harry C. Canine
BY
Woodling and Krost
ATTORNEY.

Patented Dec. 10, 1940

2,224,509

UNITED STATES PATENT OFFICE 2,224,509

DISPENSING APPARATUS

Harry C. Canine, Kentland, Ind.

Application January 6, 1940, Serial No. 312,711

9 Claims. (Cl. 221—78)

My invention relates to dispensing apparatus and more particularly to apparatus for dispensing grease from the original container as received from the distributor or from a container which may be refilled.

An object of my invention is to provide a readily attachable dispensing apparatus which may be easily clamped to an original grease container or to a container which may be refilled with grease.

Another object of my invention is the provision of a grease dispensing apparatus which when attached to a container is arranged to force the grease within the container through a delivery or discharge duct directly into grease guns, transmissions, differentials, or any other location where grease may be required.

Another object of my invention is the provision of a flared conical adapter upon the discharged end of the duct to accommodate the filling of grease guns at different diameters.

Another object of my invention is the provision of a cap for covering the flared conical adapter which is arranged to be resiliently held in place on top of the flared conical adapter.

Another object of my invention is the provision of a flexible hose which is arranged to be connected to the upper end of the discharge duct and which is made of synthetic rubber to resist chemicals or other damaging elements.

Another object of my invention is the provision of an elbow adapter arranged to engage the upper end of the discharge duct so that as the grease flows therefrom it may drop downwardly into a grease gun or other device.

Another object of my invention is the provision of a grease dispensing device arranged to be detachably connected to the top of a container and arranged such that the piston may be removed from the container without removing the yoke which extends across and above the container.

Another object of my invention is the provision of a grease dispensing device in which the piston rod that depresses the piston into the container may be readily removed from the piston and from the handle and the toggle or ratchet means which engages the piston rod upon depressing the piston into the container.

Another object of my invention is the provision of a grease dispensing device arranged to be detachably connected to the top of a container in which the piston rod may be readily detachable from the piston within the container and readily removable from the engaging means that force the piston rod downwardly for ejecting the grease.

Another object of my invention is the provision of a washer toggle or ratchet which permits the ready removal of the piston rod from the assembly.

Another object of my invention is the provision of a floating and pressure responsive sealing gasket for the piston which fits in the container.

Another object of my invention is the provision of a sealing band having a webbed central portion and beaded edge portion which fits between the lid of the container and the top edge of the container so as to make a sealing engagement therebetween as the lid is fastened to the top of the container.

Other objects and a fuller understanding of my invention may be had by referring to the following description and claims taken in conjunction with the accompanying drawing, in which:

Figure 1 is a perspective view of my dispensing apparatus as it appears when attached to the upper edge of a container.

Figure 2 is a fragmentary view showing my washer toggle or ratchet in a position which it occupies when the handle is raised.

Figure 3 is a view similar to Figure 2 but shows the position of the washer toggle or ratchet when the handle is being depressed.

Figure 4 is a side view of a cap which is arranged to resiliently engage the upper edge of the flared conical adapter of my device.

Figure 5 is a plan view of a cap shown in Figure 4.

Figure 6 is a side elevational view of a flexible tube or hose which is arranged to be connected to the upper end of the discharge duct of my device.

Figure 7 is a side elevational view of an elbow adapter arranged to be attached to the upper end of the discharge duct of my device.

Figure 8 is a fragmentary view of a container in cross-section which shows my new and improved sealing arrangement between the lid of the container and the upper edge of the container, and Figure 9 shows an enlarged perspective view of the strip arranged to fit between the lid and the upper edge of the container to make a good sealing engagement.

While I will describe my invention as being particularly adaptable for ejecting grease from a container it is understood that my invention may be readily applied for ejecting other materials from a container. Therefore, when the word grease is used herein it is to be understood that the invention is not limited to grease dispensing only but covers the dispensing of other materials.

With reference to Figure 1 of the drawing, my grease dispensing apparatus is illustrated generally by the reference character 16 and is arranged to be detachably connected to a container 15 which may be either the original container in which the grease is supplied or a refill container which may be used over-and-over again. The grease dispensing apparatus may be conveniently and readily detachably connected to the upper edge of the container by means of a split clamping band 17 having a clamping screw 18 for solidly clamping the same to the upper outer edge surface of the container. The grease dispensing device comprises generally a yoke 20, a handle 21, a piston 22, a discharge duct 25, a piston rod 23, a washer toggle or ratchet 24 which is arranged to engage the piston rod 23 and depress the piston 22 downwardly within the container as the handle 21 is depressed.

Inasmuch as a considerable amount of hand pressure is required to depress the handle 21, particularly when ejecting rather stiff grease from the container through the duct 25, I have arranged to make the yoke 20 of my device in the form of a channel with lateral flanges. By means of this construction the yoke will stand a considerable amount of stress without bending as heavy pressure is applied to the handle 21. At a spaced distance to the right from the piston rods 23, the sides of the channel of the yoke are raised to provide a fulcrum or pivot support for the handle 21 through which a pin or bolt 30 extends. The outer ends of the yoke are bent downwardly and are suitably connected to the clamping band 17 upon diametrically opposite sides of the container such as by welding at the points 31. In accordance with this construction the yoke extends across and above the container. As illustrated, the yoke is provided with an opening 32 substantially mid-way its ends through which the piston rod 23 extends. The handle 21 is also provided with an opening 33 which registers with the opening 32 of the yoke and through which the piston rod 23 extends. The right hand end of the handle 21 is provided with a boss portion 34 spaced from the upper surface of the handle 21 and forms a recess 35. The washer toggle or ratchet 24 surrounds the piston rod 23 and rests on top of the handle 21 with the right-hand side thereof loosely fitting within the recess 35 formed by the boss 34.

The piston rod 23 is arranged to be detachably connected to the piston 22 by means of a threaded engagement 38 which comprises a threaded opening in the piston 22 and a threaded end upon the piston rod 23. The upper end of the piston rod 23 is provided with a flat portion which may be conveniently engaged by a suitable tool for disengaging the piston rod 23 from the piston 22.

Inasmuch as certain irregularities may appear in the inside surface of the grease container, I provide for making a good seal for the piston to accommodate this variation by utilizing a floating sealing gasket 40 which is responsive to the build-up of pressure in the grease below the piston. The floating sealing gasket 40 is provided with an inward or lateral flange which loosely fits within an annular groove 39 around the circumference of the piston 22. The floating sealing gasket 40 also extends downwardly into a circumferential flange portion 41 so that as pressure is built up in the grease below the piston 22 the pressure exerts a force outwardly upon the downwardly extending flanged portion 41 to make a pressure responsive seal. In order to withstand or resist the deteriorating action of chemicals or other damaging elements of the grease or of other material I provide for making the floating sealing gaskets 40 of synthetic rubber having the property to resist deterioration and devulcanization. The inward or lateral flange of the sealing gasket 40 fits loosely into the annular groove 39 so that it may be characterized as a floating seal in that the entire seal is free to expand radially by the inward or lateral flange moving outwardly within the annular groove 39.

The discharge duct 25 is arranged to be rigidly connected to the piston 22 and extend upright within the container 15 and as the piston 22 is depressed grease flows through the discharge duct 25 to fill a receiving device such, for example, as a grease gun 44. Inasmuch as there are many different kinds and sizes of grease guns on the market, I provide a flared conical adapter 43 upon the upper end of the discharge duct 25 which accommodates many different kinds and sizes of grease guns. In filling a grease gun it is only necessary to position the grease gun into the flared conical adapter and hold the grease gun therein by pushing down on same as the handle 21 is operated. The adapter flares out at an angle of about 45 degrees as this is the angle which most closely conforms to the angle found upon the bottom edge of most grease guns. Therefore, as the grease gun 44 is depressed within the flared conical adapter 43 the lower angular edge surface of the grease gun closely engages the angle of the conical adapter. The largest diameter of the conical adapter is sufficient to take care of the largest practical grease guns on the market and the smallest diameter is such that the smallest sizes of practical grease guns will not slip down into the duct 25. The conical adapter 43 is arranged to be covered by a resiliently engaging cap 45 which may be connected thereto by means of a link 46 so that it will not become lost. The cap 45 is provided with a downwardly extending flange 47 which extends around the periphery of the cap for more than half of a circle. The link 46 gives sufficient play so that the cap may be positioned upon the flared adapter in an offset manner and then the cap is slid laterally with respect to the conical adapter causing the ends of the flange 47 to resiliently give until the cap fits centrally over the conical adapter. By means of this construction the cap 45 is not easily knocked off of the conical adapter during the ordinary handling of the device and thus dirt and other impurities are prevented from entering the grease at the upper end of the discharge duct 25.

Inasmuch as a considerable amount of pressure is required to eject the grease through the duct 25 and particularly when the grease is rather heavy, I provide for making the bottom 48 of the container 15 arcuate so that it will withstand a considerable amount of pressure without bulging at irregular places. The internal peripheral edge of the bottom of the container is provided with a recess 49 into which the downwardly extending portion 41 of the floating seal fits as the piston 22 approaches and engages the bottom 48 of the container. The bottom of the piston 22 is arcuate and conforms substantially to the arcuate bottom 48 of the container so that as the piston is completely depressed all of the grease is removed therefrom.

In the operation of my grease dispensing device for filling a grease gun 44, for example, it is only necessary to take one hand and hold a grease gun as shown within the flared conical adapter 43 and take the other hand and operate the handle 21 up and down. As the handle is raised as shown in Figure 2 the washer toggle or ratchet 24 is constrained at an angle to the piston rod 23. In the raised position the washer does not engage the underneath side of the boss 34. The constraining of the washer at an angle to the piston rods 23 causes the right-hand and left-hand inside edges of the washer to dig in or nick the shaft 23. The washer is made of hard treated material so that it has the property of digging into the piston rod 23 which is of a softer material. As the handle 21 is moved downwardly the washer 21 will remain in its angular position as shown in Figure 2 until the boss 34 engages the right-hand edge of the washer and upon further depressing of the handle the washer digs further into the shaft 23 until it makes a good gripping engagement sufficient to push the piston rod 23 downwardly with considerable force to eject the grease from the container through the discharge duct 25. Figure 3 shows the washer as it appears about the piston rod 23 when the handle is being depressed for ejecting the grease. It is not necessary to have a series of pre-formed notches in the rod 23 into which the washer 24 may engage because in my device the washer 24 makes it own notch or nick upon each operation of the handle 21. Because of the enlarged size of the piston 22 which fits into the container 15 it ordinarily requires only three or four up-and-down strokes of the handle 21 to fill the average size grease gun. As the grease rises in the grease gun 44, the entrapped air escapes through a vent 42. When the gun is completely filled with grease, the gun will slightly rise from the flared conical adapter and this is an indication for the operator to stop pumping. The gun may then be removed from the adapter and the excess grease may be sheared off by sliding the bottom edge of the gun laterally against the top edge of the adapter. After the grease gun is filled and removed, the cap 45 is positioned over the upper edge of the flared conical adapter 43 and the apparatus may be set aside until it is again required to fill the grease gun 44 during which time no dirt or other impurities can enter the grease.

After the piston 22 is fully depressed and engages the bottom 48 of the container 15, the piston 22 is then ready for removal from the container. In my invention this may be readily done without removing the yoke 20. In removing the piston 22 it is only necessary to take a wrench and engage the flat portion 37 and unscrew the piston rod 23 from the piston 22. When the piston rod is unscrewed it is then raised until it is pulled out of the washer 24. The operator then grasps the discharge duct 25 and raises the piston 22 within the container. The space between the yoke 20 and the top edge of the container is sufficient that the piston 22 may be pulled out sideways after it has cleared the top of the container. Therefore, in my device the piston 22 may be readily removed from the container without removing the yoke 20. Upon the unscrewing of the piston rod 23 from the cylinder 22 several functions take place. First, upon the unscrewing of the piston rod 23 from the piston 22 air is permitted to pass through the threaded opening within the piston 22 and enter the space below the piston 22. In other words, the removing of the rod 23 from the piston 22 breaks the vacuum which would otherwise be formed upon the raising of the piston 22 within the container. Because of the size of the diameter of the container 15 this vacuum action is ordinarily sufficient to make it rather difficult for a man to pull the piston out of the container. In my device, the vacuum is broken immediately upon the unscrewing of the rod 23 and therefore the piston 22 may be easily removed without exerting a very heavy pulling force. Another function growing out of the detachment of the piston rod 23 from the cylinder 22 is the fact that the operator may take hold of the discharge duct 25 and lean it over to one side so as to cause the piston 22 to assume an angle with respect to the bottom of the container which aids in the further removal of the piston 22 from the container. The same freedom of movement of the piston 22 is also present when assembling my device in that the piston 22 may be inserted within the container while the yoke is on the container by slipping the piston 22 under the yoke laterally and then angularly positioning the piston 22 within the upper edge of the container so as to make an easy insertion within the container. If the piston 22 were held rigidly in a horizontal plane, for example, by the piston rod 23 during the insertion of the piston 22 in the upper edge of the container it ordinarily would be rather difficult to make the insertion because of the close engagement fit. But, by positioning the piston 22 at a slight angle the piston 22 may be worked easily into the top edge of the container 15. Therefore, the function of removing the piston rod 23 from my device aids materially in readily removing and inserting the piston from or into the container 15 without removing the yoke 20. In this connection it is to be noted that the washer toggle or ratchet 24 is of the character that the piston rod may be readily removed after it is once threadably disengaged from the piston 22. Therefore, the nature of the toggle has a direct bearing upon the function of removing the piston rods 23.

There are some applications where it is desirable to feed the discharge grease directly into the differential or transmission or other housing of machinery without the use of a grease gun and in these instances I have provided a tube or flexible hose 50 having an enlarged end 51 adapted to fit over the outside of the upper end of the discharge duct 25. The enlarged end 51 of the flexible hose 50 may be clamped to the upper end of the discharge duct 25 by means of a clamping band 53. The smaller end 52 of the flexible tube 50 is reduced in order that it may easily fit within the openings in the differential, transmission or other housings of machinery. In practice, I preferably make the flexible tube 50 out of synthetic rubber which is designed to resist the deteriorating action of chemicals and other damaging elements in the grease.

In Figure 7 I show an elbow type of an adapter 54 which is arranged to fit the top end of the duct 25 and which extends over the outside edge of the container so that as the grease or other material is ejected therefrom it may fall downwardly into the grease gun 44 or other device.

In Figures 8 and 9 I show an improved arrangement for sealing the lid 57 on top of the container 15 into which the grease is supplied. The arrangement comprises the employment of a resilient or compressible band 58 having a central webbed portion 61 and lateral bead edge portions 59 and 60. The material is cut of such lengths as to circumferentially engage the upper edge of the container and rest thereon as the lid is being depressed within the container. In depressing the lid within the container the inside edge of the lid engages the bead 59 and draws it within the container while stretching the web portion and the other bead 60 is constrained to tightly engage the upper edge of the container. When the lid is fully depressed the bead 59 is resiliently constrained to engage the inside edge of the lid and the container and the bead 60 is constrained to engage the outside edges of the container and the lid. In the process of depressing the lid 57 within the container the webbed portion is stretched and hence draws the two beads 59 and 60 together and causes them to make a good sealing engagement between the lid 57 and the container 15. The strip of material is preferably made of synthetic rubber made to resist the deteriorating action of chemicals or other damaging elements in grease. Upon the full depression of the lid into the container, spaced tabs 63 may then be bent downwardly until they engage the underneath edge of the top of the container which makes a firm engagement for holding the lid 57 within the container. The strip may be provided with binding material or a suitable glue which tends to make the strips stick to the upper edge of the container while inserting the lid. The glue also aids in creating an air-tight seal between the lid 57 and the container.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

1. A dispensing device for a grease container or the like having an open top comprising, in combination, a yoke mountable upon the container, said yoke having upright end portions extending upwardly from the container and an intermediate portion positioned above and extending substantially diametrically across the container, a movable handle having one of its ends fastened to the yoke and having its other end adapted for operation above the intermediate portion of the yoke, said yoke and said handle each having an opening registering with each other, a piston for the container, said piston having a thickness less than the length of the upright end portions of the yoke to enable the piston to be inserted into or withdrawn from the open top of the container underneath of the yoke without removing the yoke from the container, said piston having an opening from one side to the other, a piston rod for depressing the piston into the container, an upright discharge duct connected to the piston through which the grease flows as the piston is depressed in the container, the lower end of the piston rod engaging the piston and closing the said opening therein and the upper end of the piston rod extending through the registering openings of the yoke and handle, said handle having a boss portion spaced from the top surface thereof and forming a recess, a toggle washer actuated by the handle and adapted to engage the piston rod and depress the piston in the container, said washer surrounding the piston rod and positioned on the top surface of the handle with one side of the washer loosely fitting into the recess, said piston rod being readily insertable through the washer and the registering openings of the handle and the yoke and readily attachable to the piston for mounting the piston for operation in the container and being readily detachable from the piston and readily withdrawal from the registering openings of the yoke and handle and the washer for removing the piston from the container, the detachment of the piston rod from the piston breaking the vacuum which would otherwise be established under the piston upon raising it in the container for removing same therefrom, said discharge duct providing a hand grasp for inserting the piston in or withdrawing it from the container.

2. A dispensing device for a grease container or the like having an open top comprising, in combination, a yoke mountable upon and positioned above the container, a movable handle fastened to the yoke and adapted for operation, a piston for the container, said piston having a thickness less than the distance that the yoke is positioned above the container to enable the piston to be inserted into or withdrawn from the open top of the container underneath of the yoke without removing the yoke from the container, a piston rod for depressing the piston into the container, an upright discharge duct connected to the piston through which the grease flows as the piston is depressed in the container, engaging means actuated by the handle for engaging the piston rod to depress the piston into the container, said piston rod being readily engageable with the engaging means and readily attachable to the piston for mounting the piston for operation in the container and being readily detachable from the piston and readily disengageable from the engaging means for removing the piston from the container, said discharge duct providing a hand grasp for inserting the piston in or withdrawing it from the container.

3. A dispensing device for a grease container or the like having an open top comprising, in combination, a yoke mountable upon and positioned above the container, a movable handle fastened to the yoke and adapted for operation, a piston for the container, said piston having a thickness less than the distance that the yoke is positioned above the container to enable the piston to be inserted into or withdrawn from the open top of the container underneath of the yoke without removing the yoke from the container, a piston rod for depressing the piston into the container, an upright discharge duct connected to the piston through which the grease flows as the piston is depressed in the container, engaging means actuated by the handle for engaging the piston rod to depress the piston into the container, said piston rod being readily engageable with the engaging means and readily attachable to the piston for mounting the piston for operation in the container and being readily detachable from the piston and readily disengageable from the engaging means for removing the piston from the container, said discharge duct providing a hand grasp for inserting the piston in or withdrawing it from the container, said piston having an annular groove around the circumference thereof, and a floating and pressure responsive sealing gasket loosely fitting within the annular groove.

4. A dispensing device for a grease container or the like having an open top comprising, in combination, a yoke mountable upon and positioned above the container, a movable handle fastened to the yoke and adapted for operation, a piston for the container, said piston having a thickness less than the distance that the yoke is positioned above the container to enable the piston to be inserted into or withdrawn from the open top of the container underneath of the yoke without removing the yoke from the container, a piston rod for depressing the piston into the container, an upright discharge duct connected to the piston through which the grease flows as the piston is depressed in the container, engaging means actuated by the handle for engaging the piston rod to depress the piston into the container, said piston rod being readily engageable with the engaging means and readily attachable to the piston for mounting the piston for operation in the container and being readily detachable from the piston and readily disengageable from the engaging means for removing the piston from the container, said discharge duct providing a hand grasp for inserting the piston in or withdrawing it from the container, said discharge duct having at its upper end a flared conical surface.

5. A dispensing device for a grease container or the like having an open top and an arcuate bottom with a peripheral depressed recess comprising, in combination, a yoke mountable upon and positioned above the container, a movable handle fastened to the yoke and adapted for operation, a piston for the container, said piston having a thickness less than the distance that the yoke is positioned above the container to enable the piston to be inserted into or withdrawn from the open top of the container underneath of the yoke without removing the yoke from the container, a piston rod for depressing the piston into the container, an upright discharge duct connected to the piston through which the grease flows as the piston is depressed in the container, engaging means actuated by the handle for engaging the piston rod to depress the piston into the container, said piston rod being readily engageable with the engaging means and readily attachable to the piston for mounting the piston for operation in the container and being readily detachable from the piston and readily disengageable from the engaging means for removing the piston from the container, said discharge duct providing a hand grasp for inserting the piston in or withdrawing it from the container, said piston having an arcuate surface which substantially conforms to the arcuate bottom of the container, a peripheral gasket for the piston, said gasket entering the peripheral depressed recess as the piston approaches and engages the bottom of the container.

6. A dispensing device for a grease container or the like having an open top comprising, in combination, a yoke mountable upon and positioned above the container, a movable handle fastened to the yoke and adapted for operation, a piston for the container, said piston having a thickness less than the distance that the yoke is positioned above the container to enable the piston to be inserted into or withdrawn from the open top of the container underneath of the yoke without removing the yoke from the container, a piston rod for depressing the piston into the container, and upright discharge duct connected to the piston through which the grease flows as the piston is depressed in the container, engaging means actuated by the handle for engaging the piston rod to depress the piston into the container, said piston rod being readily engageable with the engaging means and readily attachable to the piston for mounting the piston for operation in the container and being readily detachable from the piston and readily disengageable from the engaging means for removing the piston from the container, said discharge duct providing a hand grasp for inserting the piston in or withdrawing it from the container, and a flexible hose connected to the end of the discharge duct.

7. A dispensing device for a grease container or the like having an open top comprising, in combination, a yoke mountable upon and positioned above the container, a movable handle fastened to the yoke and adapted for operation, a piston for the container, said piston having a thickness less than the distance that the yoke is positioned above the container to enable the piston to be inserted into or withdrawn from the open top of the container underneath of the yoke without removing the yoke from the container, a piston rod for depressing the piston into the container, an upright discharge duct connected to the piston through which the grease flows as the piston is depressed in the container, engaging means actuated by the handle for engaging the piston rod to depress the piston into the container, said piston rod being readily engageable with the engaging means and readily attachable to the piston for mounting the piston for operation in the container and being readily detachable from the piston and readily disengageable from the engaging means for removing the piston from the container, said discharge duct providing a hand grasp for inserting the piston in or withdrawing it from the container, and an elbow adapter mounted upon the upper end of the discharge duct to convey the discharged grease to a point outside the lateral edge of the container.

8. A dispensing device for a grease container or the like having an open top comprising, in combination, a yoke mountable upon and positioned above the container, a movable handle fastened to the yoke and adapted for operation, a piston for the container, said piston having a thickness less than the distance that the yoke is positioned above the container to enable the piston to be inserted into or withdrawn from the open top of the container underneath of the yoke without removing the yoke from the container, a piston rod for depressing the piston into the container, an upright discharge duct connected to the piston through which the grease flows as the piston is depressed in the container, engaging means actuated by the handle for engaging the piston rod to depress the piston into the container, said piston rod being readily engageable with the engaging means and readily attachable to the piston for mounting the piston for operating in the container and being readily detachable from the piston and readily disengageable from the engaging means for removing the piston from the container, said discharge duct providing a hand grasp for inserting the piston in or withdrawing it from the container, the detachment of the piston rod from the piston breaking the vacuum which would otherwise be established under the piston upon raising it in the container for removing same therefrom.

9. A dispensing device for a grease container or the like having an open top comprising, in combination, a yoke mountable upon and positioned above the container, a movable handle fastened to the yoke and adapted for operation, a piston for the container, said piston having a thickness less than the distance that the yoke is positioned above the container to enable the piston to be inserted into or withdrawn from the open top of the container underneath of the yoke without removing the yoke from the container, a piston rod for depressing the piston into the container, an upright discharge duct connected to the piston through which the grease flows as the piston is depressed in the container, engaging means actuated by the handle for engaging the piston rod to depress the piston into the container, said piston rod being readily engageable with the engaging means and readily attachable to the piston for mounting the piston for operating in the container and being readily detachable from the piston and readily disengageable from the engaging means for removing the piston from the container, said discharge duct providing a hand grasp for inserting the piston in or withdrawing it from the container, and means for breaking the vacuum which would otherwise be established under the piston upon raising it in the container for removing same therefrom.

HARRY C. CANINE.